UNITED STATES PATENT OFFICE.

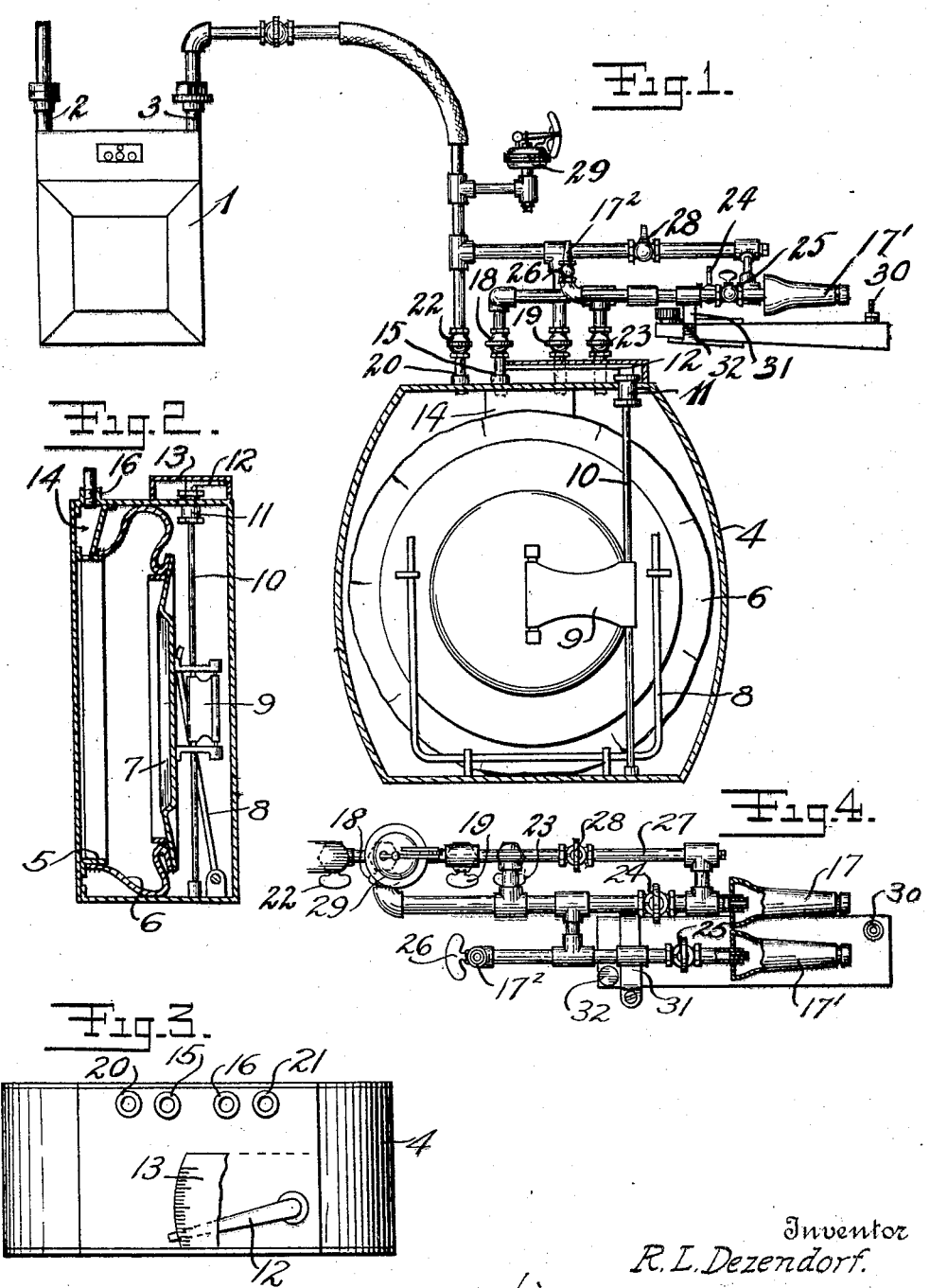

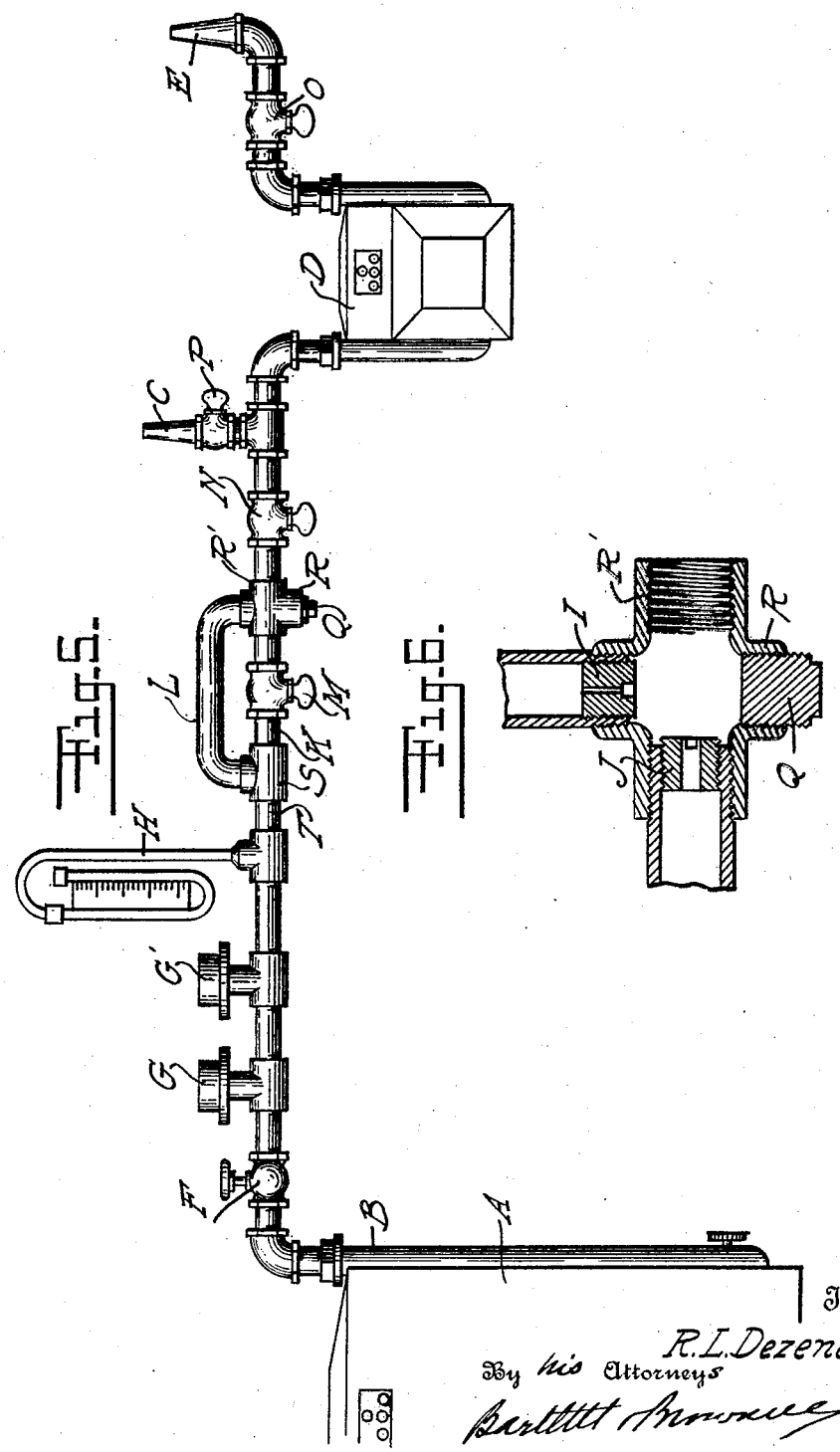

RICHARD LEE DEZENDORF, OF RICHMOND HILL, NEW YORK.

METHOD OF TESTING GAS-METERS.

1,306,660.   Specification of Letters Patent.   Patented June 10, 1919.

Application filed December 8, 1916, Serial No. 135,875. Renewed January 3, 1919. Serial No. 269,548.

*To all whom it may concern:*

Be it known that I, RICHARD L. DEZENDORF, a citizen of the United States, residing at 432 Guion avenue, Richmond Hill, Long Island, New York, have invented certain new and useful Improvements in Methods of Testing Gas-Meters, of which the following is a full, clear, and exact description.

My invention relates to a new and improved method of testing gas meters *in situ* and has for its object to provide an accurate and expeditious method of determining whether meters are running fast or slow without removing them from the premises of the user or disconnecting them from the mains. The errors in gas meters which are of the greatest importance are those which are due to what takes place when there is but a small load upon the meter and such errors can only be detected when a small load is used during the test. In order, however, to make such a test of meters now in use by methods used prior to my invention, it is necessary to pass a very considerable amount of gas through the meter, making the test tedious and involving considerable expense on account of the amount of time which the tester is required to expend for each such test. This is due to the fact that with meters now in use the test dial of the meter has to be used and that such test dial is calibrated so as to measure only relatively large amounts of gas, the passage of which at low load requires a long time. By my method a part of the movement of the test hand is made with a small load and a part with a large load, so that the total elapsed time required for the test hand to move from the starting calibration to the finishing calibration is relatively short, and yet the part made under small load is sufficient to disclose the presence of substantial error and indicate whether the meter is running substantially fast or slow. The ordinary test hand and dial of the meter can therefore, by my method, be used in making the test.

The following is a description of my improved method, reference being had to the accompanying drawings, which show apparatus by which it can be carried out. In the drawings:

Figure 1 is a side elevation of an apparatus carrying out my invention, the front of the test meter being removed;

Fig. 2 is a transfer section through the center of the test meter;

Fig. 3 is a plan view of the test meter;

Fig. 4 is a plan view of the piping connections;

Fig. 5 is a modified form of apparatus for carrying out my invention;

Fig. 6 is a detail of the same.

Referring more particularly to the drawings, 1 is a meter to be tested *in situ* having an inlet 2 and discharge 3. 4 is a test meter having a casing, to one wall of which is secured a flange 5, to which one end of a sheepskin bellows 6 is fastened. To the outer end of the bellows 6 is connected a moving disk 7, steadied by the pivoted bail 8 and having pivoted thereto a flag 9 which is rigidly connected to the flag wire 10. The flag wire 10 extends through a suitable stuffing box 11 at the top of the test meter casing and has rigidly connected thereto an arm 12 which moves beneath a casing 13. The upper side thereof, adjacent to the free end of said arm, is graduated so as to form a scale, as shown in Fig. 3. The upper end of the meter is provided with a chute 14 which opens in the chamber formed by the bellows 6 and disk 7. The bellows and disk constitute a flexible wall dividing the interior of the casing into two separate and independent chambers. Into the chute 14 open two ports 15 and 16, the former of which, 15, is connected to a discharge device having discharge burners 17, 17′ and $17^2$. The port 16 is connected by suitable piping to the discharge 3 of the meter to be tested. Adjacent to the ports 15 and 16 are cocks 18 and 19 for controlling the same. The chamber surrounding the bellows 6 is provided with two ports 20 and 21 from which extend pipes having cocks 22 and 23. The port 20 is connected by suitable piping directly with the discharge 3 of the meter to be tested while the port 21 is connected by suitable piping to the discharge device having the burners 17, 17′ and $17^2$. The burners 17, 17′ and $17^2$ are adapted to be controlled so far as they receive gas from the test meter 4 by the stop cocks 24, 25 and 26 respectively. The burner 17 and the burner 17′ are of the blue flame type, *i. e.*, Bunsen burners. Burner 17 is considerably larger than the burner 17' which furnishes a relatively small load. The burner 17² is an ordinary illuminating burner consuming but a small amount of gas and is used in part of the testing operation and also for illumination. It is of much smaller capacity than the burners 17 and 17'. Connected to the pipe supplying the burner 17 at a point beyond the cock 24 is a pipe 27 which leads from the pipe which is connected to the meter discharge and is connected thereto at a point above the stop cock 22. This pipe 27 is connected with a stop cock 28. Connected directly with the pipe leading from the meter discharge is a pressure gage or indicator 29 preferably of the dry type. In proximity to the discharge of the burner 17 and 17' is a burner 30 of a spirit lamp supported by a bracket 31 and having a filling plug 32. The burner 30 is so located that any gas discharging from the burner 17 or 17' would be at once ignited, thus constituting a pilot light, it being important to insure immediate ignition so as to prevent the escape of unburned gas.

In operating my apparatus as above described so as to carry out my method to test a meter *in situ*, I first connect it to the discharge of the meter to be tested, and I then light the spirit lamp at the burner 30. Assuming that the pointer 12 is in an intermediate position and nearer the rear end of its scale, I then open the cock 25 and the cocks 18 and 22, the cocks 19 and 23 being closed, so that the gas flows into the test meter until the hand 12 of the test meter moves to its rear initial position at the end of its scale. I then close the cock 25 and the cocks 18 and 22. I then open the cock 28 permitting the meter to be tested to run until its first hand reaches one of the divisions on the dial thereof. I then close the cock 28. The apparatus is now in condition for the beginning of the actual test.

In conducting the actual test according to my method, I first open the cocks 19, 23 and 24 and one of the cocks 25 and 26, or all of these cocks, lighting the gas escaping from the burner 17² and permit the apparatus to run until the indicator pointer 12 has completed about three-fourths of its traverse in one direction. I then, if the meter to be tested is a small meter, close off all the burners except the burner 17², watching the hand 12 on the test meter closely and as soon as that has fully completed its first traverse I close the cock 26 to burner 17². I close the cocks 23 and 19. I then open the cocks 18 and 22, then open the cock 24, and if greater speed is desired the cocks 25 and 26, lighting the gas at the burner 17², and permit the apparatus to run until the hand 12 upon the test meter has completed three-fourths of its traverse in the opposite direction. I then close the cocks 24 and 25 and let the apparatus run with the cock 26 only open until the hand on the test meter has completed its second traverse, whereupon I close the cock 26 and cocks 18 and 22. The test meter shown has a definite capacity, such that when the hand 12 thereon has completed one traverse the amount of gas that has then passed into the test meter will be one foot, so that for a double traverse of the indicating hand upon the test meter the amount of gas that has been passed through the meter to be tested will amount to two feet. Ordinary service meters have their first or test dials calibrated so as to register every two feet, so that when a test as above described has been completed observation of the first meter hand and the hand 12 upon the test meter will show whether the meter to be tested has been running fast or slow. If the test meter indicator shows that two feet have passed and the indicator upon the meter to be tested shows that less than two feet has been registered it discloses the fact that the meter to be tested is running slow and vice versa.

As stated above, the burner 17² performs two functions, one a testing function and the other that of illumination. The burner 30 insures the immediate ignition of any gas which may escape from the burners 17 and 17'. The use of blue flame burners prevents the formation of any soot which would otherwise be formed. The pressure gage 29 enables the operator to ascertain whether the pressure is normal although the operation of the testing apparatus does not depend upon the pressure and may be used to determine whether the connections are gas tight. The reason for having ports 17, 17' and 17² of different sizes is so as to be able to control the rate of discharge during a test. By using the large ports the time for the test is very materially reduced. By using a small port at the time that the indicator 12 upon the test meter is reaching either end of its traverse enables the test meter to be stopped at the moment that the end of the traverse is reached. Furthermore, in making a test errors are apparent upon a small load, which would not be noticeable if the test were made with a large load only since the defects in a meter to be tested are more evident during a time when the load thereon is small than during a time when the load thereon is great. It is not, however, necessary to make the entire test of the meter to be tested upon the small load and the use of a large load helps the test very greatly by reducing the time required without seriously interfering with the accuracy of the result. The controlling means being manually operable result in making the apparatus one of great simplicity which is not liable to get out of order.

Referring more particularly to Figs. 5 and 6, they show another form of apparatus for carrying out my method: A is a meter to be tested, the outlet port of which B is connected to the testing apparatus. The testing apparatus consists of a pipe having various instrumentalities and terminating in a burner C, a test-meter D, and in a second burner E. Adjacent to the meter to be tested is a gate valve F. Following this gate valve are two pressure regulators G—G'. Then comes a pressure indicator H. Then comes a very important element in my invention consisting in a connection having two ports I and J, one of which I is a small port so as to put a small load upon the meter, while the other J is a large port. These ports are in two separate branches of the connection; the first in the branch L and the other in the pipe K. For convenience they may be located at the fitting R. In the branch K is a cock M, whereby the large port can be cut off without cutting off the small port. Another cock N is provided so that the passage of gas through both ports can be cut off simultaneously. Other cocks O and P are provided for cutting off the flow of gas through the burners E and C respectively. This apparatus can be used to test meters in two ways, i. e., by the use of the burner C, the cock O being closed, or by the use of the test meter D and burner E, the cock P being closed.

In order that the burner C may be used in testing, the ports I and J must be carefully calibrated. Preferably, they are calibrated so that if the port I is allowed to discharge for five minutes and then the ports I and J are allowed to discharge simultaneously for five minutes the amount of gas passed in the ten minutes will be two cubic feet. These times and this amount are not essential so long as the amount of gas being passed by I in a given period and by I and J in a given period when added together equals some amount which can be easily and accurately read upon the meter being tested.

If the test meter is being used for testing, this calibration is not necessary, although even in that case the port I should constitute only a very small load and the port J should constitute a much larger load. Moreover, when the test meter is being used time is not of essence, although the elapsed time during which the small port I is alone in use should be substantial.

In testing by means of the burner C, ports I and J should be calibrated as above stated. In carrying out this test, I first close the cock O, open the cock P to the burner C and the cock N and then adjust the valve F so that the proper pressure will be indicated at the indicator H, preferably one and one-half inches water pressure. The regulators G and G' regulate this pressure when the valve F is once adjusted. I then close the cock N, the cock P being open, and then close the cock M. I then make use of a suitable time piece and wait until the pointer of the time piece registers the beginning of some minute. I then open the cock N and permit gas to escape by the burner C, igniting the same. After the gas has been burning for five minutes I open the cock M and permit the gas to escape for another five minutes and then close the cock N (or cock P). If the ports I and J have been properly calibrated two cubic feet will have escaped during this ten minutes, and if the meter to be tested registers two cubic feet, I know that it is reasonably accurate. If, however, it fails to register two cubic feet, that it, it falls short of two cubic feet, I know that it is running slow and needs attention. By this means in the short period of ten minutes a test can be given to a meter *in situ* which will determine whether it is running slow.

When the test meter D is being used I close the cock P so as to cut off the burner C; I then open the cock O and the cock M and set the valve F as before; I then close the cock N and read both meters, preferably adjusting the indicator hand on the test meter so that it corresponds to the hand on the upper dial of the meter to be tested; I then close the cock M and open the cock N; I then permit the gas to flow from the burner E, lighting the same, for a substantial period of say five minutes, and then open the cock M permitting the gas to flow through both ports I and J for another period of five minutes or preferably until the hand on one of the meters indicates two feet; I then close the cock N (or the cock O); I then compare the readings of the two meters. If the test meter registers two feet, and the meter to be tested fails to register two feet, I know that the meter to be tested is slow. If the meter to be tested registers two feet and the test meter registers more than two feet I again know that the meter to be tested is slow, and needs attention.

The important errors will for the most part result from the operation when the port I alone is used, since the errors which occur when the large port is being used are of comparative insignificance in most cases. The presence of the large port, however, enables me to obtain in a comparatively short time a large movement of the indicating hand on the meter to be tested. By providing the screw-threaded plug Q, I am enabled to remove the small port I for the purpose of cleaning the same, or of substituting a port of different size therefor for use in testing a meter of another size, a larger small port being permissible when a larger size meter is being tested. The larger port J may be removed by disconnecting the pipe from the nipple R' of the connection R.

What I claim is:

1. The method of testing gas meters which consists in passing gas through the meter *in situ* during two periods, the gas during one period constituting a small load and the gas during the other period constituting a large load and determining whether the total amount of gas passed from the beginning of the first period to the end of the last period corresponds to the amount indicated on the dial of the meter to be tested.

2. The method of testing gas meters which consists in passing gas through the meter *in situ* during two periods, the gas during one period constituting a small load and the gas during the other period constituting a large load, measuring the total amount of gas passed from the beginning of the first period to the end of the last period and comparing the same with the amount indicated on the meter to be tested.

3. The method of testing gas meters *in situ* which consists in passing gas from the main through the meter to be tested and a test meter in series until the hands of said meters pass from their initial points and one of them reaches a finishing point indicating the amount of gas which should have passed therethrough and varying the flow of gas so that during part of said passing it constitutes a large load on the meter to be tested and during a substantial part of said passing constitutes a small load upon said meter to be tested.

4. The method of testing gas meters *in situ* which consists in permitting gas from the meter to be tested to flow through a test meter until its hand reaches a proper starting point, permitting gas to flow through the meter to be tested, without flowing through the test meter, until the test hand of the meter to be tested reaches an initial point, passing gas through both meters in series for a period sufficient to bring one of said hands to a finishing point and varying the flow during said passing, so that it constitutes a small load upon the meter to be tested for a substantial part of said passing.

5. The method of testing gas meters *in situ* which consists in passing gas through the meter to be tested and a test meter in series until the hands of said meters pass from their initial points and one of them reaches a finishing point indicating the amount of gas which should have passed therethrough and causing the flow of gas to discharge from said meter to be tested through two ports one of which is of large capacity and the other of which is of small capacity, and shutting off the larger port during a substantial part of said passing.

RICHARD LEE DEZENDORF.

Copies of this patent may be obtained for five cents each, by addressing the "Commissioner of Patents, Washington, D. C."